US012424671B2

(12) United States Patent
Salles et al.

(10) Patent No.: US 12,424,671 B2
(45) Date of Patent: Sep. 23, 2025

(54) BATTERY MANAGEMENT SYSTEM INTEGRATED CIRCUIT

(71) Applicant: NXP USA, INC., Austin, TX (US)

(72) Inventors: Alain Salles, Pechbusque (FR); Patrice Besse, Tournefeuille (FR); Olivier Tico, St Lys (FR); Thierry Dominique Yves Cassagnes, Tournefeuille (FR)

(73) Assignee: NXP USA, Inc., Austin, TX (US)

( * ) Notice: Subject to any disclaimer, the term of this patent is extended or adjusted under 35 U.S.C. 154(b) by 265 days.

(21) Appl. No.: 18/187,002

(22) Filed: Mar. 21, 2023

(65) Prior Publication Data

US 2023/0307724 A1    Sep. 28, 2023

(30) Foreign Application Priority Data

Mar. 25, 2022 (EP) ..................................... 22305365

(51) Int. Cl.
*H01M 10/42* (2006.01)
*H01M 10/48* (2006.01)
(Continued)

(52) U.S. Cl.
CPC ....... *H01M 10/425* (2013.01); *H01M 10/482* (2013.01); *H02H 7/18* (2013.01);
(Continued)

(58) Field of Classification Search
CPC ............. H01M 10/425; H01M 10/482; H01M 2010/4271; H02H 7/18; H02J 7/0019; H02J 7/0029
(Continued)

(56) References Cited

U.S. PATENT DOCUMENTS 7,420,793 B2 * 9/2008 Huang ................. H10D 89/611
361/111
2009/0052101 A1 2/2009 Mrcarica et al.
(Continued)

FOREIGN PATENT DOCUMENTS

| CN | 107139778 A | 9/2017 | |
|---|---|---|---|
| CN | 108501944 A | 9/2018 | |
| KR | 101720027 B1 * | 7/2016 | ............ H02J 7/0019 |

OTHER PUBLICATIONS

Analog Devices, "LTC6810-1/LTC6810-2, 6 Channel Battery Stack Monitors", https://www.analog.com/media/en/technical-documentation/data-sheets/LTC6810-1-6810-2.pdf, downloaded Feb. 21, 2023.
(Continued)

*Primary Examiner* — Thienvu V Tran
*Assistant Examiner* — Lauren Ashley Shaw (57) ABSTRACT

A battery management system, BMS, integrated circuit, IC, (102) for a battery pack. The battery pack (101) comprises a sequence of battery cells connected in series; and a sequence of battery-cell-connection-nodes between adjacent battery cells. The BMS IC (102) comprises: a sequence of cell-measuring-pins (104) for connecting to corresponding battery-cell-connection-nodes; a plurality of bi-directional
(Continued)

ESD protection elements (105), each one connected between a pair of adjacent cell-measuring-pins (104) in the sequence; a sequence of cell-balancing-pins (106) for connecting to corresponding battery-cell-connection-nodes; and a plurality of dual polarity switches (107), each one connected between a pair of adjacent cell-balancing-pins in the sequence.

17 Claims, 4 Drawing Sheets (51) Int. Cl.
  *H02H 7/18* (2006.01)
  *H02J 7/00* (2006.01)
(52) U.S. Cl.
  CPC .......... *H02J 7/0019* (2013.01); *H02J 7/0029* (2013.01); *H01M 2010/4271* (2013.01)
(58) Field of Classification Search
  USPC ........................................................ 361/111
  See application file for complete search history.

(56) References Cited

U.S. PATENT DOCUMENTS

| | | | |
|---|---|---|---|
| 2017/0025962 A1* | 1/2017 | Davidson | H02M 1/44 |
| 2017/0093151 A1* | 3/2017 | Givelin | H02H 9/045 |
| 2020/0136366 A1* | 4/2020 | D'Angelo | H02H 1/063 |
| 2020/0395753 A1 | 12/2020 | Formenti et al. | |

OTHER PUBLICATIONS

Analog Devices, "LTC6811-1/LTC6811-2, 12-Cell Battery Stack Monitors", https://www.analog.com/media/en/technical-documentation/data-sheets/LTC6811-1-6811-2.pdf, downloaded Feb. 21, 2023.

Analog Devices, "LTC6813-1, 18-Cell Battery Stack Monitor with Daisy Chain Interface", https://www.analog.com/media/en/technical-documentation/data-sheets/LTC6813-1.pdf, downloaded Feb. 21, 2023.

D'Angelo, V., "Enhanced hotplug protection in BMS applications. Part II: Enhanced Solution Development", 2019 AEIT International Conference of Electrical and Electronic Technologies for Automotive (AEIT Automotive), Jul. 2-4, 2019.

Doridant, A., "Battery Management System Demonstrator Board design using EMC System simulation", Proc. of the 2019 International Symposium on Electromagnetic Compatibility (EMC Europe 2019), Sep. 2-6, 2019.

Maxim Integrated, "12-Channel, High-Voltage Smart Sensor Data-Acquisition Interface", MAX17843, https://www.analog.com/media/en/technical-documentation/data-sheets/max17843.pdf, downloaded Feb. 21, 2023.

Maxim Integrated, "14-Channel High-Voltage Data-Acquisition System", MAX17853, https://www.analog.com/media/en/technical-documentation/data-sheets/max17853.pdf, downloaded Feb. 21, 2023.

\* cited by examiner

BATTERY MANAGEMENT SYSTEM INTEGRATED CIRCUIT

CROSS-REFERENCE TO RELATED APPLICATIONS

This application claims the priority under 35 U.S.C. § 119 of European Patent application no. 22305365.3, filed on 25 Mar. 2022, the contents of which are incorporated by reference herein.

FIELD

The present disclosure relates to a battery management system (BMS) integrated circuit (IC) for a battery pack, wherein the battery pack comprises a plurality of battery cells connected in series. In particular, the present disclosure relates to a BMS IC that provides electrostatic discharge (ESD) protection and cell balancing.

SUMMARY

According to a first aspect of the present disclosure there is provided a battery management system, BMS, integrated circuit, IC, for a battery pack, wherein the battery pack comprises:
- a sequence of battery cells connected in series; and
- a sequence of battery-cell-connection-nodes between adjacent battery cells, wherein the BMS IC comprises:
- a sequence of cell-measuring-pins for connecting to corresponding battery-cell-connection-nodes;
- a plurality of bi-directional ESD protection elements, each one connected between a pair of adjacent cell-measuring-pins in the sequence;
- a sequence of cell-balancing-pins for connecting to corresponding battery-cell-connection-nodes; and
- a plurality of dual polarity switches, each one connected between a pair of adjacent cell-balancing-pins in the sequence.

Advantageously, such a BMS IC can perform safe monitoring when there is a bus bar present instead of a battery cell. In addition, an electrostatic discharge (ESD) architecture can be provided that is beneficial in in terms of reducing the footprint of the IC (and therefore die cost) and reducing the bill of material (requiring only minimal protecting components around the IC).

In one or more embodiments, the BMS IC further comprises: a plurality of cell-measurement-first-diodes, one for each of the cell-measuring-pins; a plurality of cell-measurement-second-diodes, one for each of the cell-measuring-pins; a ground terminal; a first voltage node; and a cell-measurement-clamp connected in series between the ground terminal and the voltage node. Each cell-measuring-pin may be connected to the anode of an associated cell-measurement-first-diode. Each cell-measuring-pin may be connected to the cathode of an associated cell-measurement-second-diode. The cathode of each cell-measurement-first-diode may be connected to the first voltage node. The anode of each cell-measurement-second-diode may be connected to the ground terminal.

In one or more embodiments, the BMS IC further comprises: a plurality of cell-balancing-first-diodes, one for each of the cell-balancing-pins; a plurality of cell-balancing-second-diodes, one for each of the cell-balancing-pins; a ground terminal; a second voltage node; and a cell-balancing-clamp connected in series between the ground terminal and the second voltage node. Each cell-balancing-pin may be connected to the anode of an associated cell-balancing-first-diode. Each cell-balancing-pin may be connected to the cathode of an associated cell-balancing-second-diode. The cathode of each cell-balancing-first-diode may be connected to the second voltage node. The anode of each cell-balancing-second-diode may be connected to the ground terminal.

In one or more embodiments, the first voltage node is isolated from the second voltage node.

In one or more embodiments, the first voltage node is not galvanically connected to the second voltage node.

In one or more embodiments, the BMS IC further comprises:
- a voltage-supply-pin for receiving a supply voltage; and
- a supply-clamp connected in series between the voltage-supply-pin and a ground terminal.

In one or more embodiments, each of the dual polarity switches comprises a pair of back to back switches.

In one or more embodiments, each of the dual polarity switches comprises a pair of back to back FETs.

In one or more embodiments, each of the dual polarity switches comprises a pair of back-to-back MOSFETs.

In one or more embodiments:
- each of the dual polarity switches comprises a first MOSFET and a second MOSFET;
- the source of the first MOSFET is connected to a first one of the associated pair of adjacent cell-balancing-pins;
- the source of the second MOSFET is connected to a second one of the associated pair of adjacent cell-balancing-pins; and
- the drain of the first MOSFET is connected to the drain of the second MOSFET.

In one or more embodiments, the gates of the first and second MOSFETs are for receiving cell-balancing-control-signals.

There is also disclosed a BMS system comprising:
- any BMS IC disclosed herein;
- a balancing-resistor connected in series between each cell-balancing-pin and its corresponding battery-cell-connection-node; and
- a resistor-capacitor network connected in series between each cell-measurement-pin and its corresponding battery-cell-connection-node.

In one or more embodiments:
- the resistor-capacitor network includes:
  - a first-resistor;
  - a first-capacitor; and
  - a second-capacitor;
- the first-resistor is connected in series between the cell-measurement-pin and the corresponding battery-cell-connection-node;
- the first-capacitor is connected in series between the battery-cell-connection-node and ground; and
- the second-capacitor is connected in series between the cell-measurement-pin and ground.

In one or more embodiments, the balancing-resistor is the only discrete component that is connected between each cell-balancing-pin and its corresponding battery-cell-connection-node.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

A function of a battery management system (BMS) IC is to monitor and balance a pack of battery cells connected in series.

Depending on the battery technology, a cell voltage can vary up to 5V. BMS ICs can be designed to monitor a battery pack having a stack of 6-cells, 14-cells, or 18-cells stacked, as non-limiting examples. The voltage per cell and the number of stacked cells defines the maximum operating voltage of the IC pins that are connected to the battery pack. For example, an 18 cell x 5V BMS IC will have a 90V maximum operating voltage on some of the IC pins.

Depending on the application, one or more of the stacked cells can be replaced by a bus bar (which provides a metal short circuit between 2 cells). Such a bus bar can create a negative voltage between the pins to which the bus bar is connected. That is, a voltage is dropped across the bus bar instead of being generated by a battery cell. One or more of the examples disclosed herein can advantageously enable the BMS IC to perform safe monitoring when there is a bus bar present instead of a battery cell. In addition, one or more of the examples disclosed herein can provide an electrostatic discharge (ESD) architecture that is beneficial in in terms of reducing the footprint of the IC (and therefore die cost) and reducing the bill of material (requiring only minimal protecting components around the IC).

Figure 1:
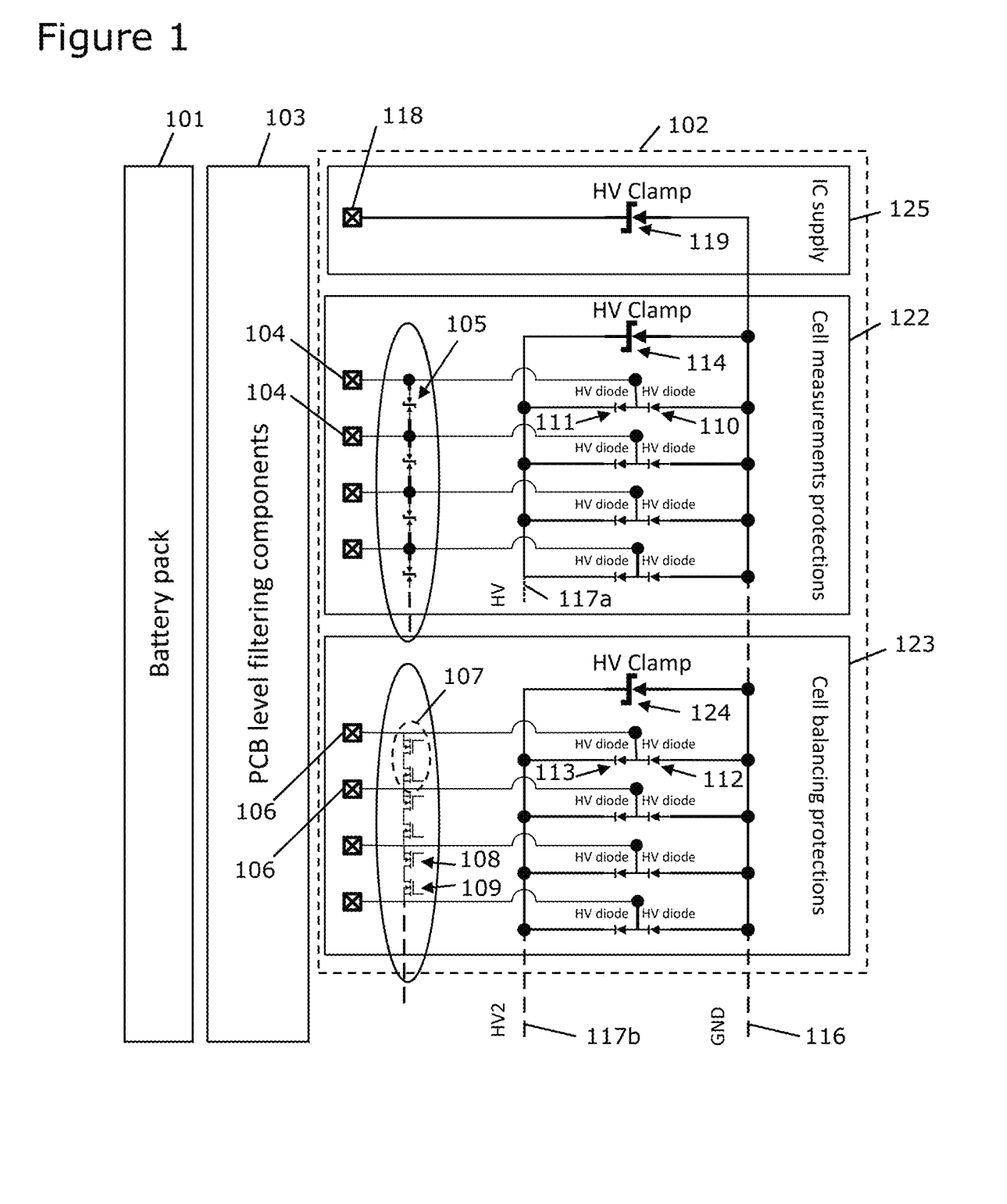
FIG. 1 illustrates an example embodiment of a BMS IC for a battery pack.

FIG. 1 illustrates an example embodiment of a BMS IC 102 for a battery pack 101. In this example the BMS IC 102 is connected to the battery pack 101 by filtering components 103. In this example the filtering components 103 are provided on a printed circuit board (PCB). Further details of the filtering components are provided below with reference to FIG. 2.

Figure 2:
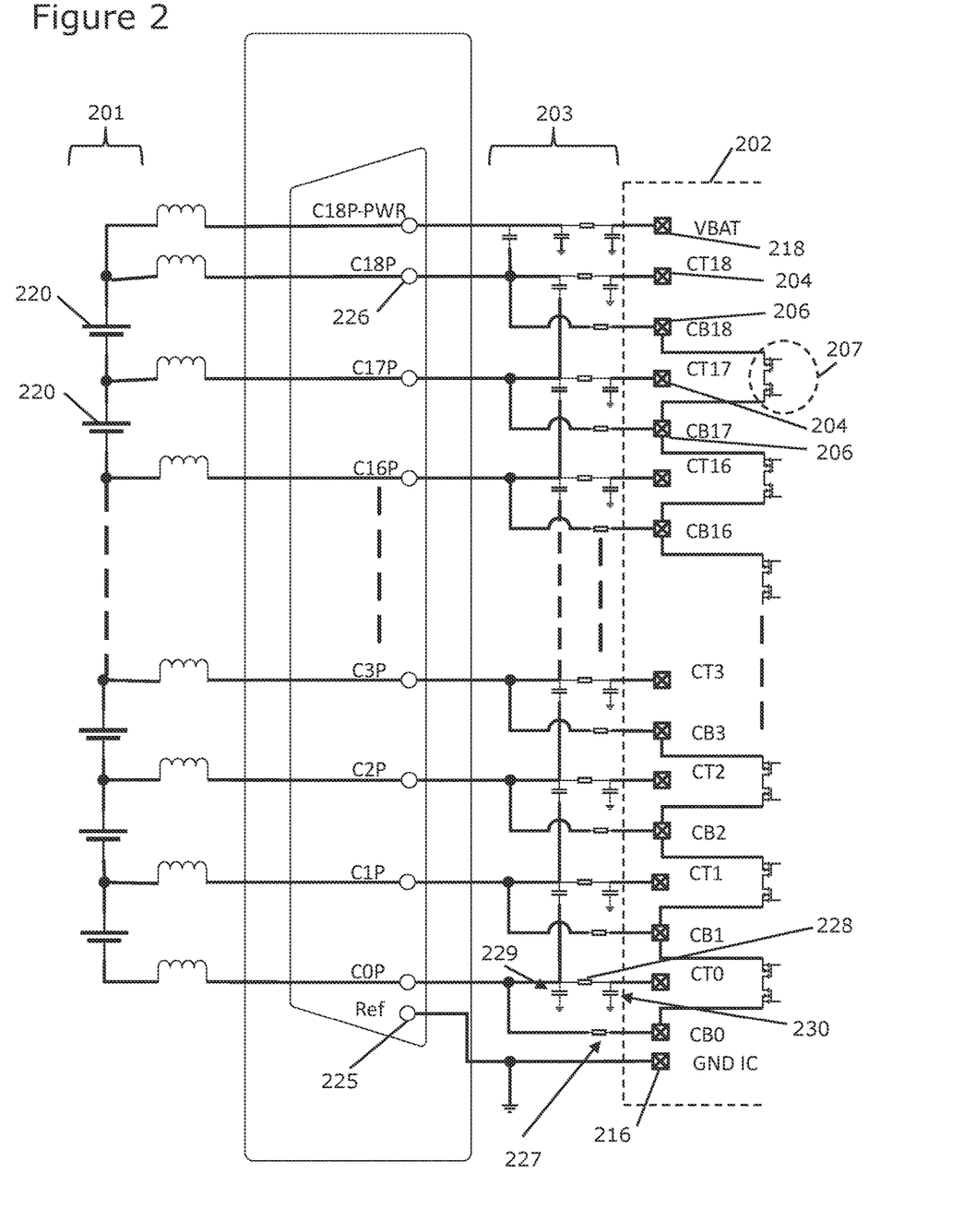
FIG. 2 shows part of a BMS system that includes an example of specific filtering components that can be located between a battery pack and a BMS IC, such as the ones that are shown in FIG. 1.

The battery pack 101 includes a sequence of battery cells connected in series, which are not visible in FIG. 1 although they are in FIG. 2. The battery pack 101 also has a sequence of battery-cell-connection-nodes between adjacent battery cells.

The BMS IC 102 includes a sequence of cell-measuring-pins 104 for connecting (via the filtering components 103 in this example) to corresponding battery-cell-connection-nodes in the battery pack 101. Adjacent cell-measuring-pins 104 are connected to adjacent battery-cell-connection-nodes such that a single battery cell in the battery pack 101 is connected between each pair of cell-measuring-pins 104. Therefore, the potential difference between adjacent cell-measuring-pins 104 corresponds to the voltage of a single battery cell.

The BMS IC 102 also includes a sequence of cell-balancing-pins 106 for connecting (again via the filtering components 103 in this example) to corresponding battery-cell-connection-nodes. These battery-cell-connection-nodes can be the same nodes (for the same battery cells) as the ones that are described above with reference to the cell-measuring-pins 104. In the same way that is described above with reference to the cell-measuring-pins 104, the cell-balancing-pins 106 are connected to the battery pack 101 such that the potential difference between adjacent cell-balancing-pins 106 corresponds to the voltage of a single battery cell.

In this example, the cell-measuring-pins 104 are identified as part of a cell measurements protection module 122. The main purpose of the cell measurements protection module 122 is to provide differential ESD protection. The cell measurements protection module 122 includes a plurality of bi-directional ESD protection elements 105, each one connected between a pair of adjacent cell-measuring-pins 104. In this example, the bi-directional ESD protection elements 105 comprise back to back NPN transistors with shorted base-emitter connections. In other examples, the bi-directional ESD protection elements 105 can be implemented as silicon controller rectifiers (SCRs), PNP components or NPN components, as non-limiting examples. The bi-directional ESD protection elements 105 provide differential and dual polarity ESD protection, and they can also handle fault and battery cell voltage inversion.

In the context of the present disclosure, bi-directional and dual polarity can be considered synonymous.

In this example, the cell-balancing-pins 106 are identified as part of a cell balancing protection module 123. The main purpose of the cell balancing protection module 123 is to provide control for balancing the individual battery cells, as well as providing a self-protecting device. Here, self-protecting means that the analog devices (that make up the cell balancing protection module 123) provide their analog function (cell balancing) as well as a protection function of the circuit against ESD. This advantageously avoids the requirement for an extra specialized device, that may otherwise be required to protect the analog devices against ESD. The cell balancing protection module 123 includes a plurality of dual polarity switches 107, each one connected between a pair of adjacent cell-balancing-pins 106. In this example, each dual polarity switch 107 is implemented as a pair of back-to-back MOSFETs 108, 109 and a common drain arrangement is used. That is: each dual polarity switch 107 comprises a first MOSFET 108 and a second MOSFET 109; the source of the first MOSFET 108 is connected to a first one of the associated pair of adjacent cell-balancing-pins 106; the source of the second MOSFET 109 is connected to a second one of the associated pair of adjacent cell-balancing-pins 106; and the drain of the first MOSFET 108 is connected to the drain of the second MOSFET 109. In other examples, a common source arrangement can be used. In further examples still, any other type of switch, including a pair of back to back FETs (which are not necessarily MOSFETs) or insulated-gate bipolar transistors (IGBTs), can be used. Any differential and dual polarity power stage devices can be used to provide the functionality of the dual polarity switches 107.

Each of the dual polarity switches 107 includes a control terminal (the gates of the first and second MOSFETs 108, 109 in the example of FIG. 1) for receiving cell-balancing-control-signals. Drivers for providing suitable cell-balancing-control-signals to the dual polarity switches 107, in order to provide a required cell balancing, are known in the art. Advantageously, the first and second MOSFETs 108, 109 can both be opened (turned off) when there is a negative voltage between the associated cell-balancing-pins 106 (for example because a bus bar is connected between the cell-balancing-pins 106 instead of a battery cell). When the first and second MOSFETs 108, 109 are both opened, they provide the required isolation between the cell-balancing-pins 106 when no cell balancing is required—this is because any cell balancing current flowing up to the battery pack/cell will generate a measurement error on both adjacent cells with respect to the bus bar. This is due to the parasitic serial resistance between battery pack cell terminal and BMS IC. Using the back-to-back arrangement of MOSFETs 108, 109 ensures that the connection between the cell-balancing-pins 106 is not shorted by the body diode of one the MOSFETs 108, 109. This is because the other MOSFET 108, 109 will be open circuit.

It is advantageous to implement the cell measurements protection module 122 separately from the cell balancing protection module 123, as shown, because this provides an isolated architecture between a primary battery measurement chain (the cell measurements protection module 122) and a secondary battery measurement chain (the cell balancing protection module 123). That is, the ESD architecture of FIG. 1 provides electrical isolation between cell measurements and cell balancing measurement chains. More particularly, the first voltage node 117a is not galvanically connected to the second voltage node 117b. It also fulfils the ISO26262 safety requirement for redundancy and independence.

In this example, the cell measurements protection module 122 and the cell balancing protection module 123 each include their own centralized ESD protection, as will be discussed below. For example, centralized ESD protection is provided for in excess of 90V, if that is the maximum expected voltage across the battery pack 101.

The cell measurements protection module 122 includes: a plurality of cell-measurement-first-diodes 111, one for each of the cell-measuring-pins 104; and a plurality of cell-measurement-second-diodes 110, again one for each of the cell-measuring-pins 104. Each cell-measuring-pin 104 is connected to the anode of an associated cell-measurement-first-diode 111. Each cell-measuring-pin is also connected to the cathode of an associated cell-measurement-second-diode 110. The anode of each cell-measurement-second-diode 110 is connected to a ground terminal 116. The cathode of each cell-measurement-first-diode 111 is connected to a first high-voltage (HV) node 117a. The cell measurements protection module 122 also includes a cell-measurement-clamp 114 connected in series between the ground terminal 116 and the first high-voltage node 117a. The cell-measurement clamp 114 may be any component that can provide the required form of ESD protection, for example known PNP or NPN transistor arrangements. In this example, the cell-measurement-clamp 114 is a high voltage (HV) clamp that can handle in excess of 90V (the maximum expected voltage across the battery pack 101).

If there is a voltage surge at any of the cell-measuring-pins 104, then the cell-measurement-first-diode 111 that is associated with that cell-measuring-pin 104 is forward biased such that a current can flow to the cell-measurement-clamp 114 and the voltage surge can be dissipated. The cell-measurement-second-diode 110 associated with the cell-measuring-pin 104 is reverse biased such that the current does not flow directly to ground. Furthermore, the cell-measurement-first-diodes 111 associated with the other cell-measuring-pins 104 are reverse biased such that the current cannot flow to the other cell-measuring-pins 104. In this way, a single cell-measurement-clamp 114 can provide (centralized) ESD protection for all of the cell-measuring-pins 104 in the cell measurements protection module 122.

Similarly, the cell balancing protection module 123 includes: a plurality of cell-balancing-first-diodes 113, one for each of the cell-balancing-pins 106; and a plurality of cell-balancing-second-diodes 112, again one for each of the cell-balancing-pins. Each cell-balancing-pin 106 is connected to the anode of an associated cell-balancing-first-diode 113. Each cell-balancing-pin 106 is also connected to the cathode of an associated cell-balancing-second-diode 112. The anode of each cell-balancing-second-diode 112 is connected to the ground terminal 116. The cathode of each cell-balancing-second-diode 113 is connected to a second high-voltage (HV2) node 117b. The cell balancing protection module 123 also includes a (HV) cell-balancing-clamp 124 connected in series between the ground terminal 116 and the second high-voltage (HV2) node 117b. The (HV) cell-balancing-clamp 124 provides centralized ESD protection in the same way as the cell-measurement-clamp 114 of the cell measurements protection module 122. Such centralized ESD protection can beneficially reduce die size and cost.

The BMS IC 102 also includes an IC supply module 125. The IC supply module 125 includes a (HV) supply-clamp 119 that is connected in series between a voltage-supply-pin 118 and the ground terminal 116. The voltage-supply-pin 118 receives the supply voltage for the BMS IC 102, and in this example is connected to a battery-cell-connection-node in the battery pack 101, for example the battery-cell-connection-node that has the highest voltage. The supply-clamp 119 provides ESD protection for any voltage surges that may occur at the voltage-supply-pin 118.

The voltage-supply-pin 118 is connected to the battery pack 101 via one or more external/discrete components (such as may be provided on the PCB that provides the filtering components 103 that are illustrated in FIG. 1). The external/discrete components that are connected between the voltage-supply-pin 118 and the battery pack 101 may be different to the discrete (filtering) components 103 that are connected between each cell-measuring-pin 104 and the battery pack 101. Therefore, when there is a surge in the battery pack 101, the specific discrete components that are provided between the battery pack 101 and the voltage-supply-pin 118, and between the battery pack 101 and the cell-measuring-pins 104, will determine how much surge current needs to be handled respectively by: the (HV) supply-clamp 119 of the IC supply module 125; and the cell-measurement-clamp 114 of the cell measurements protection module 122. The (HV) supply-clamp 119 of the IC supply module 125 and the cell-measurement-clamp 114 can therefore be dimensioned accordingly.

FIG. 2 shows part of a BMS system that includes an example of specific filtering components 203 that can be located between a battery pack 201 and a BMS IC 202, such as the ones that are shown in FIG. 1.

The BMS IC 202 shown in FIG. 2 includes a plurality of cell-measuring-pins 204, labelled as CTx, that are connected (via the filtering components 203) to corresponding battery-cell-connection-nodes 226 CxP. Where x corresponds to the number of an associated battery cell 220. In this example, the battery pack 201 includes 18 battery cells and therefore there are 18 cell-measuring-pins 204, CT1 to CT18 connected to the anode of each corresponding battery cell 220 via corresponding battery-cell-connection-nodes 226 C1P to C18P. CT0 is connected to the cathode of the first battery cell 220 in the battery pack 201 via corresponding battery-cell-connection-node 226 C0P.

The BMS IC 202 shown in FIG. 2 also includes a plurality of cell-balancing-pins 206, labelled as CBx, that are connected (via the filtering components 203) to the corresponding battery-cell-connection-nodes 226 CxP. In the same way as described above, there are 18 cell-balancing-pins 206, CB1 to CB18 connected to the anode of each corresponding battery cell 220 via corresponding battery-cell-connection-nodes 226 C1P to C18P, and also a cell-balancing-pin 206 CB0 connected to the cathode of the first battery cell 220 in the battery pack 201 via corresponding battery-cell-connection-node 226 C0P. In the same way as described with reference to FIG. 1, a dual polarity switch 207 is connected between each pair of adjacent cell-balancing-pins 206.

The BMS IC 202 shown in FIG. 2 also includes a voltage-supply-pin 218 that is connected to the anode of the last battery cell 220 in the battery pack 201 in this example, and a ground-pin 216 that is connected to ground. In this example the battery pack also has a ground-pin 225 that is connected to ground.

As shown in FIG. 2, the filtering components 203 that are located between each cell-measuring-pin 204 and the corresponding battery-cell-connection-node 226 are different to the filtering components 203 that are located between each cell-balancing-pin 206 and the corresponding battery-cell-connection-node 226. More particularly: a balancing-resistor 227 is connected in series between each cell-balancing-pin 206 and its corresponding battery-cell-connection-node 226; and a resistor-capacitor network is connected in series between each cell-measurement-pin 204 and its corresponding battery-cell-connection-node 226.

In this example, the balancing-resistor 227 is the only discrete component that is connected between each cell-balancing-pin 206 and its corresponding battery-cell-connection-node 226.

In this example, the resistor-capacitor network includes a first-resistor 228, a first-capacitor 229 and a second-capacitor 230. The first-resistor 228 is connected in series between the cell-measurement-pin 204 and the corresponding battery-cell-connection-node 226. The first-capacitor 229 is connected in series between the battery-cell-connection-node 226 and ground. The second-capacitor 230 is connected in series between the cell-measurement-pin 204 and ground.

Figure 3:
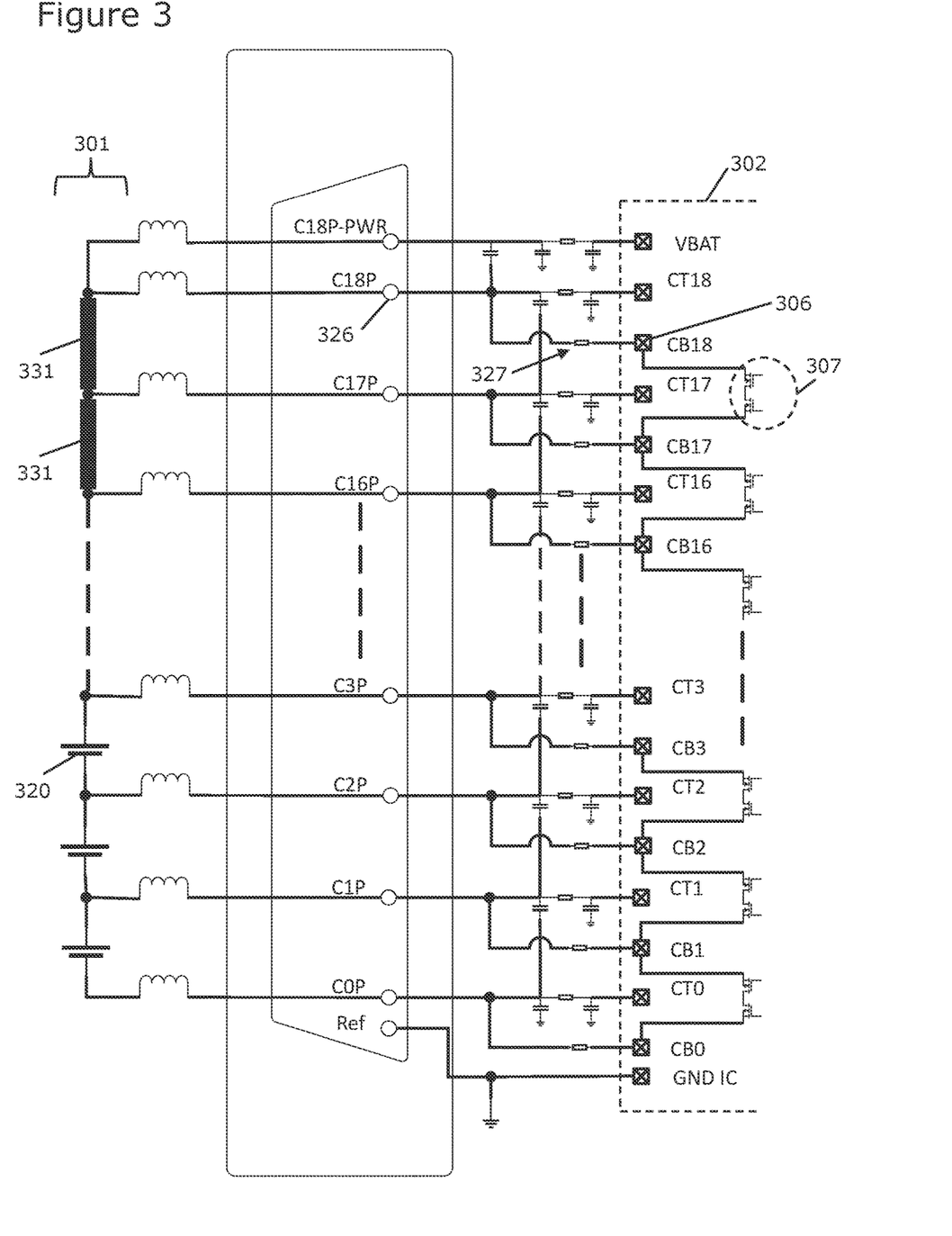
FIG. 3 shows part of the BMS system of FIG. 2 but with two of the battery cells replaced by bus bars.

FIG. 3 shows part of the BMS system of FIG. 2 but with two of the battery cells 320 replaced by bus bars 331. In particular, each of battery cells 17 and 18 have been shorted through a bus bar 331. As will be discussed below, it is an advantage of the current system that the balancing-resistors 327 and the BMS IC 302 do not need disconnecting from the battery pack 301 when a battery cell 320 is replaced or shorted by a bus bar 331. This due to, at least in part, the use of a dual polarity switch 307 between adjacent cell-balancing-pins CBx 306.

Figure 4:
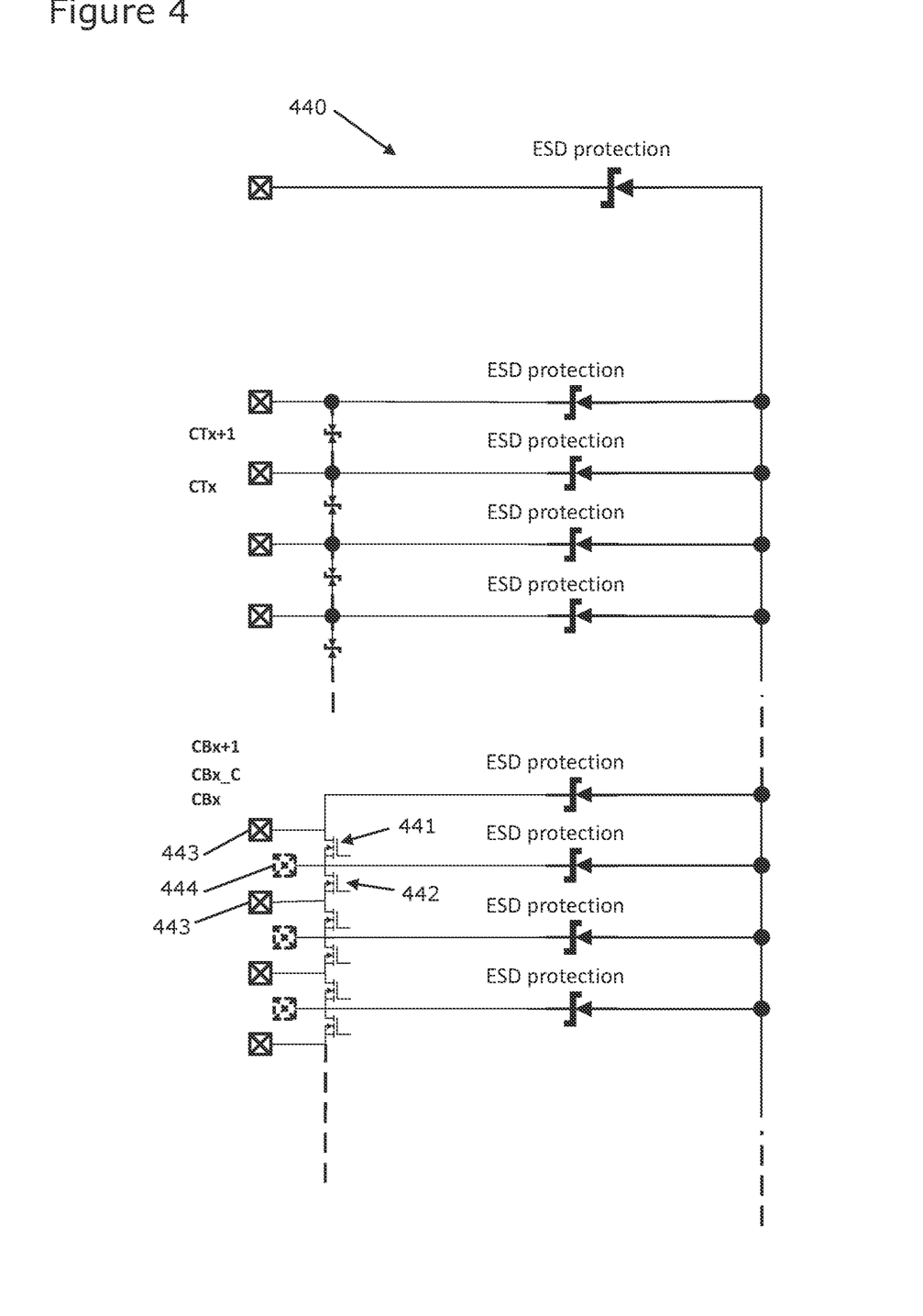
FIG. 4 shows an alternative BMS system that does not include the dual polarity switches for cell balancing that are described with reference to FIGS. 1 to 3.

FIG. 4 shows an alternative BMS system 440 that does not include the dual polarity switches for cell balancing that are described with reference to FIGS. 1 to 3. Instead, two MOSFETs 441, 442 are connected between adjacent cell-balancing-pins 443. The two MOSFETs 441, 442 are not back-to-back as they are in FIGS. 1 to 3, and therefore the two MOSFETs 441, 442 do not provide the functionality of a dual polarity switch. Because of this, the system of FIG. 4 requires an additional cell-balancing-pin 444 for each battery cell. The additional cell-balancing-pin 444 provides a connection between: the node between the two MOSFETs 441, 442; and the same battery cell in the battery pack (via one or more discrete components).

The battery charge controller (BCC) solution of FIG. 4 requires a 64 pin package to allow measurement of 14 cells with primary CTx pins and also secondary/redundancy cell voltage measurement using cell balancing pins (using a repeated pattern of 3 pins: CBx, CBx_C and CBx+1). Redundancy Cell voltage measurement is made in a differential way to measure 2 adjacent cell voltage: cell x (with CBx_C and CBx pins) and cell x+1 (with CBx+1 and CBx_C pins) with cell balancing resistors located only in serial with pins CBx and CBx+1.

The next group of cells (cell x+2 and cell x+3) is connected using the same pins pattern, and this allows to get a sort of pin redundancy in between CBx+1 and CBx+2 being connected to the same positive terminal of cell 2 in serial with a cell balancing resistor (not shown).

This pin redundancy (every 2 pins) allows 1 of the 2 pins to be disconnected in case a cell is replaced with a bus bar (e.g. low Ohmic metal connection allowing to interconnect 2 adjacent battery cells together) to prevent a "regular" cell balancing pass device (one of the NMOS devices 441, 442 shown in FIG. 4) from having its body diode conduct current that would then degrade the accuracy of an adjacent cell voltage measurement. Advantageously, the system of FIGS. 1 to 3 does not requires such a disconnection, and therefore it functions in a simpler way. Furthermore, the system of FIGS. 1 to 3 requires fewer pins because it does need the additional cell-balancing-pins 444 of FIG. 4.

The BCC solution provided by FIGS. 1 to 3 enables a 64 pin package to be used to measure 18 cells with primary CTx pins and also secondary/redundancy cell voltage measurement using cell balancing pins (using now CBx, CBx+1, etc). Thereby avoiding the need for the CBx_C pins (6 in this case) that are shown in FIG. 4. This increase in the number of battery cells that can be measured and balanced with a BMS IC having a fixed number of pins (or, similarly, a reduction in the number of pins required to measure and balance a battery pack having a fixed number of cells) is a very significant advantage. Furthermore, the dual polarity switches (e.g., back-to-back NMOSs) in the system of FIGS. 1 to 3 are functional to prevent current flowing in a cell balancing single pass device. That is, a different cell-balancing pass device arrangement is used in FIGS. 1 to 3 when compared with that of FIG. 4.

The system of FIG. 4 requires a common pin (the additional cell-balancing-pin 444) between 2 stacked NMOS 441, 442, and the protection between 2 pins is uni-polar. Furthermore, there is no ESD centralized topology with respect to ground in the system of FIG. 4. In contrast, the system of FIGS. 1 to 3 does not require a common pin between 2 stacked NMOS devices. This is because the protection between 2 pins is bi-polar since the NMOS devices are back-to-back. Furthermore, the system of FIGS. 1 to 3 provides an ESD centralized topology with respect to ground, and therefore advantageously decreases the number of clamps from the pins to ground.

The system of FIGS. 1 to 3 can also provide an advantage in terms of issues that can arise when "plugging in" the PCB to the battery pack (hot-plug).

Electronic best practice to avoid failure is to connect first the ground pin (0V potential) then sequentially the pins with increasing potential. 'Hot-plug' is an uncontrolled connection of a battery pack (with unknown state of charge) to a BMS application (PCB).

For example, for an electrical connection of a 38 pin battery pack (with various potential from 0V to 80V) to the 38 pins connector of a BMS application. The sequence in which the pins are connected may not be controlled; they may be randomly connected depending on an operator that is handling the connectors.

For a BMS application, the PCB with filtering components can be represented by an RLC filter. Thus, a hot-plug event can generate voltage and current oscillations which energy (v(t)*i(t)*t), which must be handled by the IC. The ESD architecture of FIGS. 1 to 3 can sustain this stress due to:

a centralized ESD that can be optimized to not turn-on during a hot-plug event while being active during other ESD fast transients; and
   a differential ESD topology on CBx pins that is used to bleed-off the hot-plug current out of the IC.

Furthermore, the examples of FIGS. 1 to 3 can provide differential ESD protection by reusing analog front end MOSFETs in self-triggering mode. As they are used for the cell balancing function, the MOSFET channel width and length (W/L) is calculated for a low RDSON (i.e. the resistance between the drain and the source when the switch is on), which is compatible with fast and high current transients. Also, all differential ESD protections can allow a negative differential voltage, making the system fault tolerant (reverse battery connection, negative transient during battery hot-plug).

In addition, the systems of FIGS. 1 to 3 are compatible with electrical isolation between the two measurements chains embedded into the BMS. This isolation is a safety requirement to reduce the likelihood of the BMS losing battery cell measurement functionality in case of short circuit between a CTx pin and a CBx pin.

Advantageously, examples disclosed herein provide an ESD architecture that complies with several critical BMS (Battery Management System) constraints. The proposed architecture is also able to protect a HV (high voltage) system from large current inrush while improving fault tolerance.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A battery management system, BMS, integrated circuit, IC, for a battery pack, wherein the battery pack comprises:
   a sequence of battery cells connected in series; and
   a sequence of battery-cell-connection-nodes between adjacent battery cells, wherein the BMS IC comprises:
      a sequence of cell-measuring-pins for connecting to corresponding battery-cell-connection-nodes;
      a plurality of bi-directional ESD protection elements, each one connected between a pair of adjacent cell-measuring-pins in the sequence;
      a sequence of cell-balancing-pins for connecting to corresponding battery-cell-connection-nodes;
      a plurality of dual polarity switches, each one connected between a pair of adjacent cell-balancing-pins in the sequence;
      a plurality of cell-balancing-first-diodes, one for each of the cell-balancing-pins;
      a plurality of cell-balancing-second-diodes, one for each of the cell-balancing-pins;
      a ground terminal;
      a second voltage node; and
      a cell-balancing-clamp connected in series between the ground terminal and the second voltage node;
      wherein:
         each cell-balancing-pin is connected to the anode of an associated cell-balancing-first-diode;
         each cell-balancing-pin is connected to the cathode of an associated cell-balancing-second-diode;

the cathode of each cell-balancing-first-diode is connected to the second voltage node; and
the anode of each cell-balancing-second-diode is connected to the ground terminal.

2. The BMS IC of claim 1, further comprising:
a plurality of cell-measurement-first-diodes, one for each of the cell-measuring-pins;
a plurality of cell-measurement-second-diodes, one for each of the cell-measuring-pins;
a ground terminal;
a first voltage node; and
a cell-measurement-clamp connected in series between the ground terminal and the voltage node;
wherein:
each cell-measuring-pin is connected to the anode of an associated cell-measurement-first-diode;
each cell-measuring-pin is connected to the cathode of an associated cell-measurement-second-diode;
the cathode of each cell-measurement-first-diode is connected to the first voltage node; and
the anode of each cell-measurement-second-diode is connected to the ground terminal.

3. The BMS IC of claim 2, further comprising:
a voltage-supply-pin for receiving a supply voltage; and
a supply-clamp connected in series between the voltage-supply-pin and a ground terminal.

4. The BMS IC of claim 2, wherein each of the dual polarity switches comprises a pair of back to back switches.

5. The BMS IC of claim 1 wherein the first voltage node is isolated from the second voltage node.

6. The BMS IC of claim 5, wherein the first voltage node is not galvanically connected to the second voltage node.

7. The BMS IC of claim 1, wherein each of the dual polarity switches comprises a pair of back to back switches.

8. The BMS IC of claim 7, wherein each of the dual polarity switches comprises a pair of back to back FETs.

9. The BMS IC of claim 8, wherein each of the dual polarity switches comprises a pair of back-to-back MOSFETs.

10. The BMS IC of claim 1, further comprising:
a voltage-supply-pin for receiving a supply voltage; and
a supply-clamp connected in series between the voltage-supply-pin and a ground terminal.

11. A BMS system comprising:
the BMS IC of claim 1;
a balancing-resistor connected in series between each cell-balancing-pin and its corresponding battery-cell-connection-node; and
a resistor-capacitor network connected in series between each cell-measurement-pin and its corresponding battery-cell-connection-node.

12. The BMS system of claim 11, wherein:
the resistor-capacitor network includes:
a first-resistor;
a first-capacitor; and
a second-capacitor;
the first-resistor is connected in series between the cell-measurement-pin and the corresponding battery-cell-connection-node;
the first-capacitor is connected in series between the battery-cell-connection-node and ground; and
the second-capacitor is connected in series between the cell-measurement-pin and ground.

13. The BMS system of claim 12, wherein the balancing-resistor is the only discrete component that is connected between each cell-balancing-pin and its corresponding battery-cell-connection-node.

14. The BMS system of claim 11, wherein the balancing-resistor is the only discrete component that is connected between each cell-balancing-pin and its corresponding battery-cell-connection-node.

15. A battery management system, BMS, integrated circuit, IC, for a battery pack, wherein the battery pack comprises:
a sequence of battery cells connected in series; and
a sequence of battery-cell-connection-nodes between adjacent battery cells, wherein the BMS IC comprises:
a sequence of cell-measuring-pins for connecting to corresponding battery-cell-connection-nodes;
a plurality of bi-directional ESD protection elements, each one connected between a pair of adjacent cell-measuring-pins in the sequence;
a sequence of cell-balancing-pins for connecting to corresponding battery-cell-connection-nodes;
a plurality of dual polarity switches, each one connected between a pair of adjacent cell-balancing-pins in the sequence;
wherein:
each of the dual polarity switches comprises a pair of back-to-back MOSFETS including a first MOSFET and a second MOSFET;
the source of the first MOSFET is connected to a first one of the associated pair of adjacent cell-balancing-pins;
the source of the second MOSFET is connected to a second one of the associated pair of adjacent cell-balancing-pins; and
the drain of the first MOSFET is connected to the drain of the second MOSFET.

16. The BMS IC of claim 15, wherein the gates of the first and second MOSFETs are for receiving cell-balancing-control-signals.

17. The BMS IC of claim 15, further comprising:
a plurality of cell-balancing-first-diodes, one for each of the cell-balancing-pins;
a plurality of cell-balancing-second-diodes, one for each of the cell-balancing-pins;
a ground terminal;
a second voltage node; and
a cell-balancing-clamp connected in series between the ground terminal and the second voltage node;
wherein:
each cell-balancing-pin is connected to the anode of an associated cell-balancing-first-diode;
each cell-balancing-pin is connected to the cathode of an associated cell-balancing-second-diode;
the cathode of each cell-balancing-first-diode is connected to the second voltage node; and
the anode of each cell-balancing-second-diode is connected to the ground terminal.

* * * * *